US010382497B2

(12) United States Patent
Florey et al.

(10) Patent No.: US 10,382,497 B2
(45) Date of Patent: Aug. 13, 2019

(54) INSTANT AGENT

(71) Applicant: Florey Insurance Agency, Inc., Clarks Summit, PA (US)

(72) Inventors: Thomas E. Florey, South Abington Township, PA (US); Hector A. De La Cruz, Exeter, PA (US)

(73) Assignee: The Florey Insurance Agency, Inc., Clarks Summit, PA (US)

( * ) Notice: Subject to any disclaimer, the term of this patent is extended or adjusted under 35 U.S.C. 154(b) by 0 days.

(21) Appl. No.: 15/806,727

(22) Filed: Nov. 8, 2017

(65) Prior Publication Data

US 2019/0141087 A1 May 9, 2019

(51) Int. Cl.

| H04N 5/44 | (2011.01) |
|---|---|
| H04N 7/14 | (2006.01) |
| H04N 7/15 | (2006.01) |
| G06Q 40/08 | (2012.01) |
| H04L 29/06 | (2006.01) |
| H04L 29/08 | (2006.01) |

(52) U.S. Cl.
CPC ........ *H04L 65/1069* (2013.01); *H04L 67/141* (2013.01); *H04N 7/147* (2013.01); *H04N 7/148* (2013.01); *H04N 7/15* (2013.01); *G06Q 40/08* (2013.01); *H04L 67/306* (2013.01); *H04N 5/4403* (2013.01)

(58) Field of Classification Search
CPC combination set(s) only.
See application file for complete search history.

(56) References Cited

U.S. PATENT DOCUMENTS

| 2012/0092439 A1* | 4/2012 | Mackie | H04N 7/147 |
| | | | 348/14.06 |
| 2014/0173701 A1* | 6/2014 | Albouyeh | H04L 63/08 |
| | | | 726/4 |
| 2015/0229487 A1* | 8/2015 | Lickliter | H04L 12/1827 |
| | | | 709/203 |

(Continued)

*Primary Examiner* — Phung-Hoang J Nguyen
(74) *Attorney, Agent, or Firm* — Zale Patent Law, Inc.; James E. McDaniel; Lawrence P. Zale

(57) ABSTRACT

A system is described for setting up videoconferencing between a user 1, 3, 5 and an agent 13, 23, 33 with little or no downloads and configuration. A director 500, 1500, 2500 receives requests from users 1, 3, 5 on computing devices 200, 400, 700 for videoconferences through a website. A connection ID device 520 receives input from the user 1, 3, 5 as to which connection application 210, 220, 410, 710, 720 the user 1, 3, 5 is using. A platform selection device 530 then uses lookup device 531 to find compatible videoconferencing format of the connection application 210, 220, 410, 710, 720 in a compatibility table 533 and determines which video hosting platform 7, 9, 11, 12 employs this compatible videoconferencing format. A linking device 540 then sends a link to the video hosting platform 7, 9, 11, 12 to the user's computing device 200, 400, 700 and agent's computing device 300, 600 to connect and videoconference. In an alternative embodiment, a linking device 540 routes communications from the user's computing device 200, 400, 700 and the agent's computing device 300, 600 to/from the video hosting platform 7, 9, 11, 12. In still another embodiment, the software on the user's end may be in the form of an App which directly links to the director.

17 Claims, 6 Drawing Sheets

(56) References Cited

U.S. PATENT DOCUMENTS

| | | | |
|---|---|---|---|
| 2016/0048932 A1* | 2/2016 | McNelley | G06Q 50/01 |
| | | | 705/5 |
| 2016/0127536 A1* | 5/2016 | Jayapalan | H04M 3/2281 |
| | | | 379/265.02 |
| 2017/0149707 A1* | 5/2017 | Hattar | H04L 51/066 |
| 2017/0300286 A1* | 10/2017 | Lieb | G06F 3/1454 |
| 2018/0270277 A1* | 9/2018 | Blanchard | H04L 65/1069 |

* cited by examiner

US 10,382,497 B2

INSTANT AGENT

CROSS REFERENCE TO RELATED APPLICATIONS

Not applicable.

FIELD

The current invention relates to a system enabling a user to instantly and remotely video conference with a business associate to do business; and more specifically to a system enabling a user to instantly and remotely video conference with an insurance agent to start and service policies, without requiring setup by the user.

BACKGROUND

Several decades ago, it was common for an insurance agent to meet with prospective customers in person to explain different coverages, costs and answer questions. These meetings allowed the potential customer not only to gain information about the coverage and costs, but also allowed the potential customer to build trust in the agent, and develop a relationship with a specific agent who would service the policy over the course of many years.

In the current era of on-line insurance purchases, potential customers no longer receive the same advantages of the in-person meetings. Many have never seen or conversed with an agent. Also, each time a customer calls, they may be passed to different agents, and never develop a relationship with any particular one. Since there is no relationship, there is little trust in any of the personnel at the insurance company. The customer begins to feel isolated, anonymous and simply a small player in a large organization.

There have been many attempts to provide videoconferencing in a business setting. These usually require proper setup at the business's side, which is no problem, but also at the user's (customer's) side. If the customer is familiar with the business and trusts the business, the customer may allow downloads of software to set up his/her machine for the videoconference.

However, if the user is a potential customer, and has had little experience with the business, (s)he may be wary of downloading programs with which (s)he is unfamiliar. This may be plug-ins or extensions for browsers, as well as entire stand-alone programs. It is now well known that this is one of the ways that malware is introduced into computers. The malware can disrupt operation of the user's computer, as well as possibly, erase data or drives, or turn it into a 'zombie' robot that follows the direction of a remote computer, creates and releases viruses, collects financial and personal information, steals a user's identity, etc.

For these and other reasons, a user gets suspicious when required to download software. This does not help build trust, but breeds suspicion.

Other videoconferencing sites require one to start an account with the site. These require information designed to uniquely identify the user. Once identified, the user may be tracked through various websites and information collected on this user.

Again, the potential customer will begin to lose confidence in the business, possibly believing that the business is 'stalking' the user through cyberspace.

Almost all the videoconferencing sites require either a download of software, or setting up an account.

There are various software browsers used for communicating with a website. Some of these are not compatible with some video hosting websites. Therefore, if a potential customer tries to use a browser that is not compatible with the video hosting web service, it fails to connect. If the user is not very familiar with networking, they typically give up indicating that the system does not work. In the insurance market, agents typically deal with many who are unfamiliar with video hosting, networking and configuration of telecommunications. Many of these are older people who have little experience with on-line systems. Therefore, it is imperative that the system work with little input required from the user. This is also an aspect of building trust. The systems must be simple, work the first and every time with little input required by the user.

Currently, there is a need for a system which provides face-to-face meetings between potential customers and insurance agents, that is easy to operate, requires little input from the user and does not require risky downloads.

BRIEF SUMMARY

The present invention may be embodied as a system 100, 1000, 2000 for allowing videoconferencing between a user 1,3,5 and an agent 13,23,33 that does not require downloading of software, having a user's computing device 200, 400, 700 adapted to connect to a web server, and connect to a video hosting platform 7, 9, 11, 12 and videoconference with other computing devices connected to the same video hosting platform 7, 9, 11, 12. It also has an agent's computing device 300, 600 adapted to connect to a web server using a connection application 210, 220, 410, 710, 720, and connect to a video hosting platform 7, 9, 11, 12 and videoconference with other computing devices connected to the same video hosting platform 7, 9, 11, 12. The system includes a director 500, 1500, 2500 having a web server adapted to provide web pages upon receiving a request; a connection ID device 520 adapted to identify a connection application 210, 220, 410, 710, 720 of the user's computing device 200, 400, 700; a platform selection device adapted to identify video hosting platforms 7, 9, 11, 12 compatible with the browser currently used by the user's computing device 200, 400, 700; and a linking device adapted to link the user's computing device 200, 400, 700 and the agent's computing device 300, 600 to the compatible video hosting platform 7, 9, 11, 12.

The current invention may also be embodied as a method of providing video conferencing between a user 1, 3, 5 and an agent 13, 23, 33 following the steps of: (steps 841-849) completing initial setup of the system 100, 1000, 2000; (step 805) selecting a web connection application 210, 220, 410, 710, 720; (step 807) using a user's computing device 200, 400, 700 to contact a website of an agent 13, 23, 33; (step 809) indicating that the user 1, 3, 5 would like to videoconference with the agent 13, 23, 33; (step 811) determining the connection application 210, 220, 410, 710, 720 being used by the user's computing device 200, 400, 700; (step 813) determining the current video format capabilities of the user's connection application 210, 220, 410, 710, 720; (step 813) looking up a compatible video hosting platform 7, 9, 11, 12 in a compatibility table 533; (step 815) connecting the user's computing device 200, 400, 700 to the compatible video hosting platform 7, 9, 11, 12; (step 817) connecting an agent's computing device 300, 600 to the video hosting platform 7, 9, 11, 12 to which the user's computing device 200, 400, 700 is connected; and (step 819) videoconferencing the user's computing device 200, 400, 700 with the agent's computing device 300, 600 in real time.

The current invention may also be embodied as a system 100, 1000, 2000 for allowing videoconferencing between a user 1, 3, 5 and an agent 13, 23, 33 that does not require downloading of software. The system includes a user's computing device 200, 400, 700 adapted to connect to a web server, and connect to a video hosting platform 7, 9, 11, 12 and videoconference with other computing devices 300, 600 connected to the same video hosting platform 7, 9, 11, 12. It also includes an agent's computing device 300, 600 adapted to connect to a web server and to a video hosting platform 7, 9, 11, 12 and videoconference with other computing devices connected to the same video hosting platform 7, 9, 11, 12. A connection ID device 520 identifies the connection application 210, 220, 410, 710, 720 type of the user's computing device 200, and a platform selection device 530 identifies video hosting platforms 7, 9, 11, 12 compatible with the connection application 210, 220, 410, 710, 720 currently used by the user's computing device 200, 400, 700. A director 500 is included that has a web server 510 adapted to provide web pages upon receiving a request, and a linking device 540 adapted to link the user's computing device 200, 400, 700 and the agent's computing device 300, 600 to the compatible video hosting platform 7, 9, 11, 12.

BRIEF DESCRIPTION OF SEVERAL VIEWS OF THE DRAWINGS

The above and further advantages may be better understood by referring to the following description in conjunction with the accompanying drawings, in which like numerals indicate like structural elements and features in various figures. The drawings are not necessarily to scale; emphasis instead being placed upon illustrating the principles of the concepts. For example, the dimensions of some of the elements in the figures may be exaggerated relative to other elements to help to improve understanding of various example embodiments. Also, common but well-understood elements that are useful or necessary in a commercially feasible embodiment are often not depicted in order to facilitate a less obstructed view of these various example embodiments.

DETAILED DESCRIPTION

Figure 1:
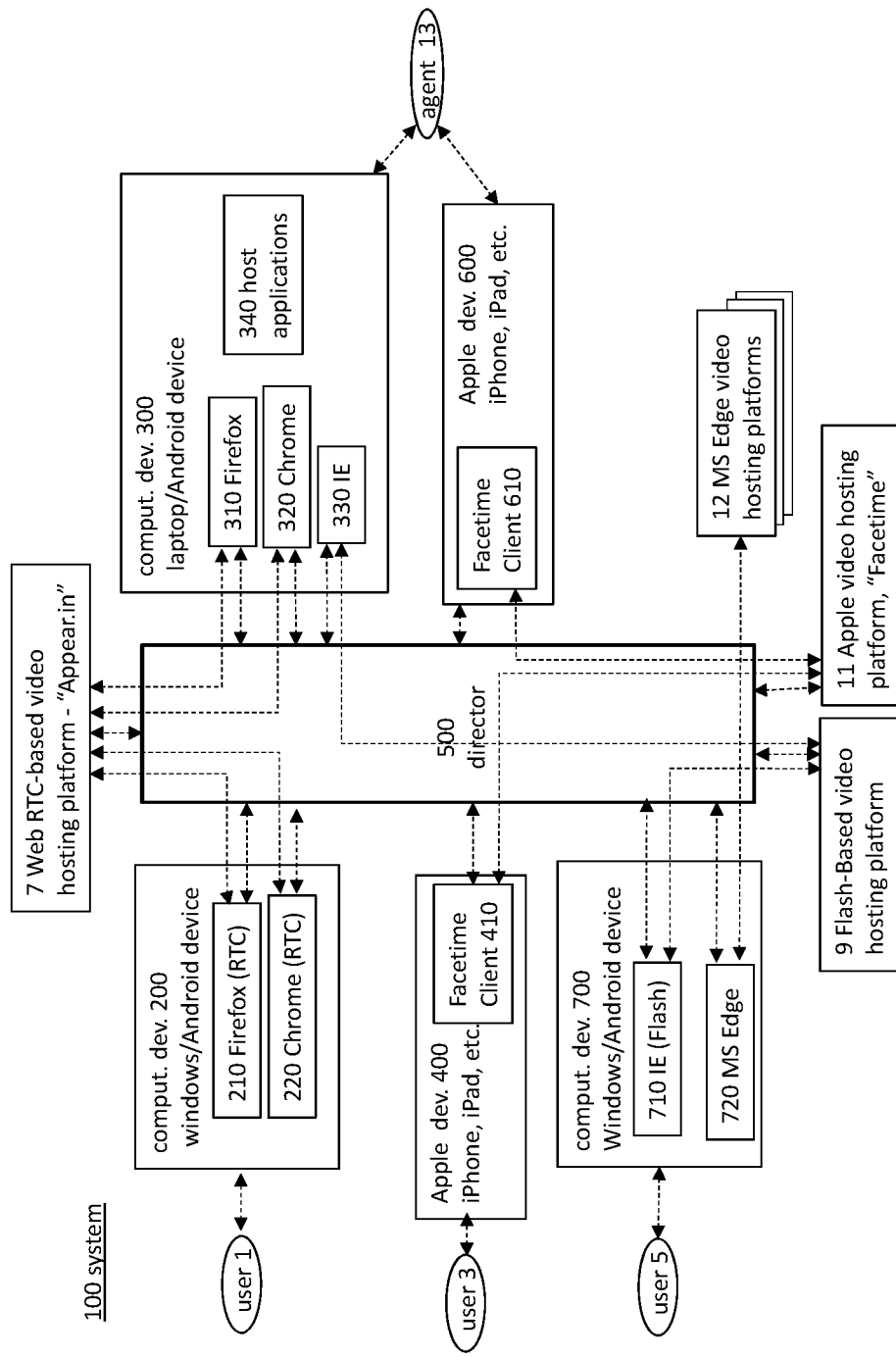
FIG. 1 is a block diagram of one embodiment of a system in accordance with the present invention.

At least some of the following exemplary embodiments provide an improved system and method suitable for requesting, automatically configuring and participating in live videoconferences. Many other advantages and improvements will be discussed in more detail below, or will be appreciated by the skilled person from carrying out exemplary embodiments based on the teachings herein. The exemplary embodiments have been described particularly in relation to the insurance industry. However, it will be appreciated that the example embodiments may be applied in many other specific uses.

Theory

There are many videoconferencing services available. Some are browser-based and others use proprietary software clients at the user side.

For example, WebEx requires that a proprietary WebEx client be downloaded and configured for use. Another example is "GotoMeeting.com". This also requires a download of software and configuration to use the service.

Similarly, there are other videoconferencing services that require the user to download proprietary client software to use the service.

"Appear.in" and "Megameeting.com" are two videoconferencing services that allow a user to connect to a videoconferencing service with a browser. "Appear.in" employs an RTC format for communications between the user and the Appear.in server.

Megameeting.com employs a different format and employs Flash technology by Adobe.

The three major browsers used are Firefox, Google Chrome and Microsoft's Internet Explorer.

There are numerous browser plug-ins and add-ons that can be downloaded and installed in the browsers which will allow the browsers to use these, and other videoconferencing services. However, as indicated above, one goal of the current invention is to reduce or eliminate the requirement of downloading and installing software. Users do not want to spend time and effort downloading and installing software. If a website requires them to do so, they will simply go to another website, and a potential customer is lost.]

For those who try to download and install software, they may incorrectly install it, or may configure it improperly. This may cause the site to function improperly, or not at all. The user, most probably, will go to a different website. Therefore, another potential customer is lost.

Browsers are now distributed with inherent capabilities and have pre-installed plug-ins. For example, Firefox is distributed with the capability of running RTC communications format with no additional plug-ins, add-ons, or extensions.

Therefore, Firefox is compatible with the communications format for Appear.in videoconferencing. However, Firefox, without modification, cannot run Flash-based videoconferencing of Megameeting.com.

Similarly, Chrome can run RTC format communications, but cannot run Flash-based videoconferencing service of Megameeting.

Internet Explorer, without modification, is capable of running the Flash-based Megameeting, but is not compatible with Appear.in.

Anyone using an iPhone, iPad or Apple laptop or Apple desktop computer would be running an entirely different set of software than any of those described above. This is because these are all based upon the Apple Operating System.

Facetime is an Apple proprietary videoconferencing service that runs on Apple mobile devices that run on iOS, and Macintosh computers that run Mac OS X (version 10.6.6 and later versions). Therefore, the company needs a device which runs iOS or Mac OS X to communicate with a potential client on an Apple device.

Therefore, the system should be capable of either automatically sensing the operating system and the type of browser that the user is running, or receiving input from the user as to this information. Then, the system must determine which videoconferencing service will be able to run with the user's unmodified browser.

Implementation

The current system is best used to service businesses which run more efficiently when the employees and potential clients have face-to-face meetings. It is explained in this application with respect to use in the insurance industry. However, it should be known that this system, with minor modification may be implemented in various other industries.

FIG. 1 is a block diagram of one embodiment of a system in accordance with the present invention. FIG. 1 shows the system 100 for providing live video conferencing between a plurality of users, user 1, user 3, user 5 and an agent 11. User 1 interacts through a computing device 200, which is shown here as a Windows or Android device.

Similarly, User 5 has a Windows or Android computing device.

User 3 has an iPod, iPad, iPhone, Macintosh or other iOS device, which are collectively referred to as an Apple device 400.

At least one of users 1, 3, 5 using computing device 200 would like to communicate with agent 11 through the agent computing device 300. The system is intended to provide video conferencing between the agent 11 and any of the users with little or no setup or configuration on the part of the users.

There are video hosting services and/or websites which provide services that can link users with the agent 11 to have video conference sessions. At least a few of these services will also allow agent 11 to share the output of the screen of computing device 300 with at least one of the users.

Web RTC-based video hosting service 7 is one type of video conferencing service such as the website known as "Appear.in". This video hosting site performs video conferencing using RTC-based video format.

There are also video hosting services which use other communications formats. For example, video hosting service 5, shown here as "Megameeting.com" uses Adobe Flash for video conferencing.

Both the web-RTC and Flash formats require connection through a web browser. Computing device 200 has an installed browser, shown here as Mozilla Firefox 210 and/or Google Chrome 220. The current versions of both of these browsers have the capability of interfacing with web-RTC-based videoconference sites/service without requiring any downloads, plug-ins, or special configurations.

However, computing device 700 used by user 5 only has the Internet Explorer (IE) web browser 710 and a Microsoft Edge web browser. Even though IE 710 is compatible with web-RTC videoconferencing, it operates much better with Flash-based web services.

The Microsoft Edge browser 720 is intended to be compatible with the Microsoft video hosting platform 12. Microsoft Edge supports web-RFC video format. Below is a list of other video formats supported by Microsoft Edge.+

| Media file to serve | Extension setting | Mime type setting |
|---|---|---|
| Video MP4 | .mp4 | video/mp4 |
| Video WebM | .webm | video/webm |
| Video HLS | .m3u8 | application/vnd.apple.mpegurl, audio/mpegurl, application/x-mpegurl, or audio/x-mpegURL |
| Video DASH | .mpd | application/dash+xml |
| Video Motion JPEG | .mjpeg | video/x-motion-jpeg |

Apple device 400 is not compatible with Adobe Flash, and will not work with the Flash-based video hosting platform 9. The Apple device 400 is also not compatible with the web-RTC service video hosting platform 7.

Apple device 600 performs videoconferencing using the Apple proprietary Facetime Client 410 to communicate with the Apple video hosting platform 11, without the need for a browser.

Computing device 300 used by Agent 13 must connect to the same video hosting platform to which the user has connected, in order to videoconference.

Therefore, if user 5 would like to videoconference with agent 13, they should both connect to Flash-based video hosting platform 9, since computing device 700 is only running Internet Explorer browser that works best with Flash-based video hosting format, and the Windows/Android device 700 cannot connect to the Apple video hosting platform 11 since it does not run the iOS Operating System.

Figure 3A:
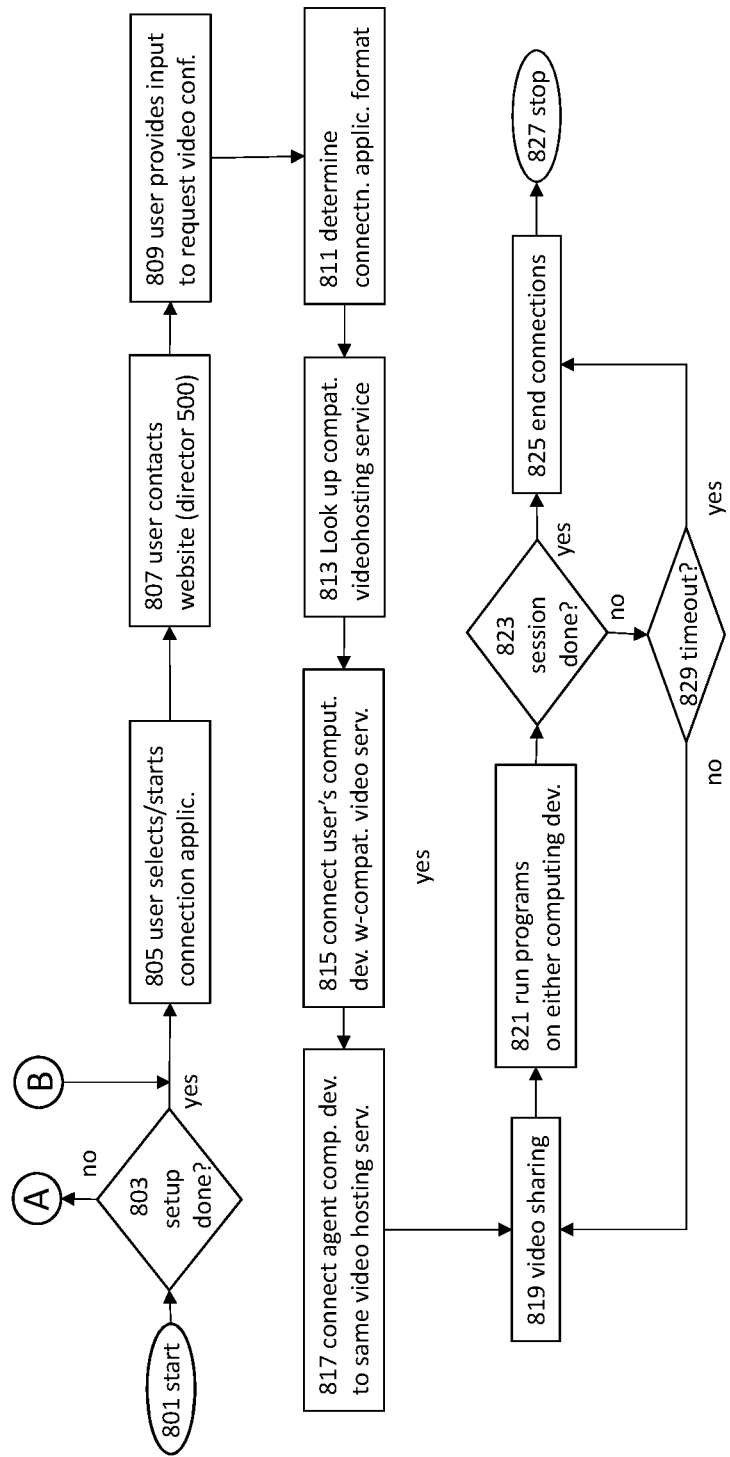
FIGS. 3A and 3B together are a simplified flowchart illustrating the major steps of a process according to the current invention.
Figure 3B:
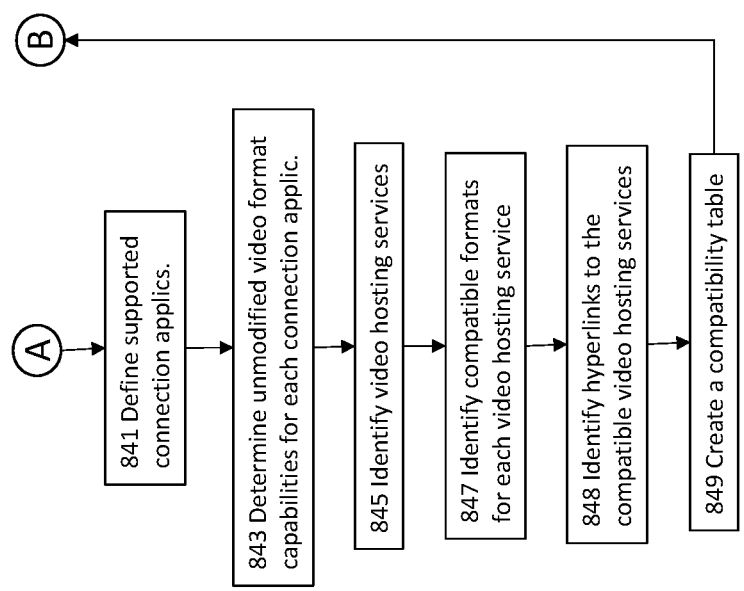

FIGS. 3A and 3B together are a simplified flowchart illustrating the major steps of a process according to the current invention. The embodiment of FIG. 1 will now be explained in connection with FIGS. 1, 3A, and 3B to indicate the structure and functioning of the system according to one embodiment of the present invention.

The process starts at step 801 in FIG. 3A. In step 803, the computing device 300 identifies if the system went through the setup process as set forth in FIG. 3B.

Assuming that setup has been completed ("yes"), processing continues at step 805.

In step 805, the user selects a browser and starts it.

In step 807, user 1 connects through the selected browser running on computing device 200, to a website linking the user's computing device 200 to a director 500, which may be a web server.

In step 809, user 1 provides input indicating that the user would like to have a video conference with the agent 13. The user 1 may do this by selecting a button on the website screen requesting a video conference. User 1 may also indicate which connection application they would like to use for video conferencing. This may be a browser, Facetime client or software compatible with the Facetime client.

In step 811, if a valid connection application has not been provided by user 1, or if no connection application has been provided by user 1, director 500 determines which connection application is being used. This may be done by asking the user to provide input identifying the connection application being used. Alternatively, a device inside of the director 500 can analyze the signal provided by the connection application to determine which type it is.

Also in step 811, the director 500 looks up the connection application in the compatibility table created during setup, to determine the format to use for videoconferencing.

In step 813, director 500 looks up compatible video hosting service platforms in the compatibility table for the connection application/operating system being used.

In the embodiment of FIG. 1, Director 500 makes a connection between the user's computing device 200 and the compatible video hosting service platform 7, 9, 11, 12 found in the compatibility table, as indicated in step 815.

In step 817, director 500 also makes a connection between the agent's computing device 300 and the same video hosting platform 7, 9, 11, 12 to which computing device 200 is connected.

In step 819, user 1 and agent 13 are able to freely video conference. In this embodiment, all communications are passing through director 500 in both directions.

In step 821, the agent 13 has the ability to run programs and share screens with user 1. Agent 13 may then run software to calculate premiums and coverage and share the results with user 1.

In step 823, either user 1 or agent 13 may indicate that the session is over.

In step 825, the connections are ended, and processing stops at step 827.

In the event the session is not done in step 823 "no", in step 829 it is determined if the system has timed out. If so, "yes", step 825 is executed.

If in step 829, it is determined that there has not been a time-out, then processing continues at step 819.

Referring now back to step 803 of FIG. 3A, if it is determined that setup has not yet been completed ("no") then processing continues at step 841 of FIG. 3B.

In step 841, the connection application that the system is to support is determined. This may be browsers such as Google Chrome, Mozilla Firefox and Internet Explorer. For the Apple iOS systems, this will be Facetime or compatible software.

In step 843, it is determined which format capabilities each supported browser has. This will be the capabilities it has in its current common distribution. Some of these have built-in capabilities, or are distributed with pre-installed plug-ins, extensions or add-ons. Specifically, it is determined which video conferencing formats each can support straight 'out of the box'. This is typically how a user, and more specifically, a less sophisticated user employs their browser.

In step 847, a plurality of web hosting platforms 7, 9, 11, 12 that may potentially be used are identified and their formats noted. Those having formats which match the formats of the browsers, and in the case of an Apple device, which match the Apple video format of Facetime client, are determined.

In step 849 the web hosting platforms 7, 9, 11, 12 that have formats compatible with the supported browsers or Facetime client are entered into a compatibility table along with their format. There is also at least one entry for Apple devices using Facetime client.

Processing then continues at step 805 of FIG. 3A.

The above description is for illustrative purposes and describes user 1 connecting to the system for videoconferencing with the agent 13. However, the other users may also connect through the system and connect with agent 13, in turn.

Figure 2:
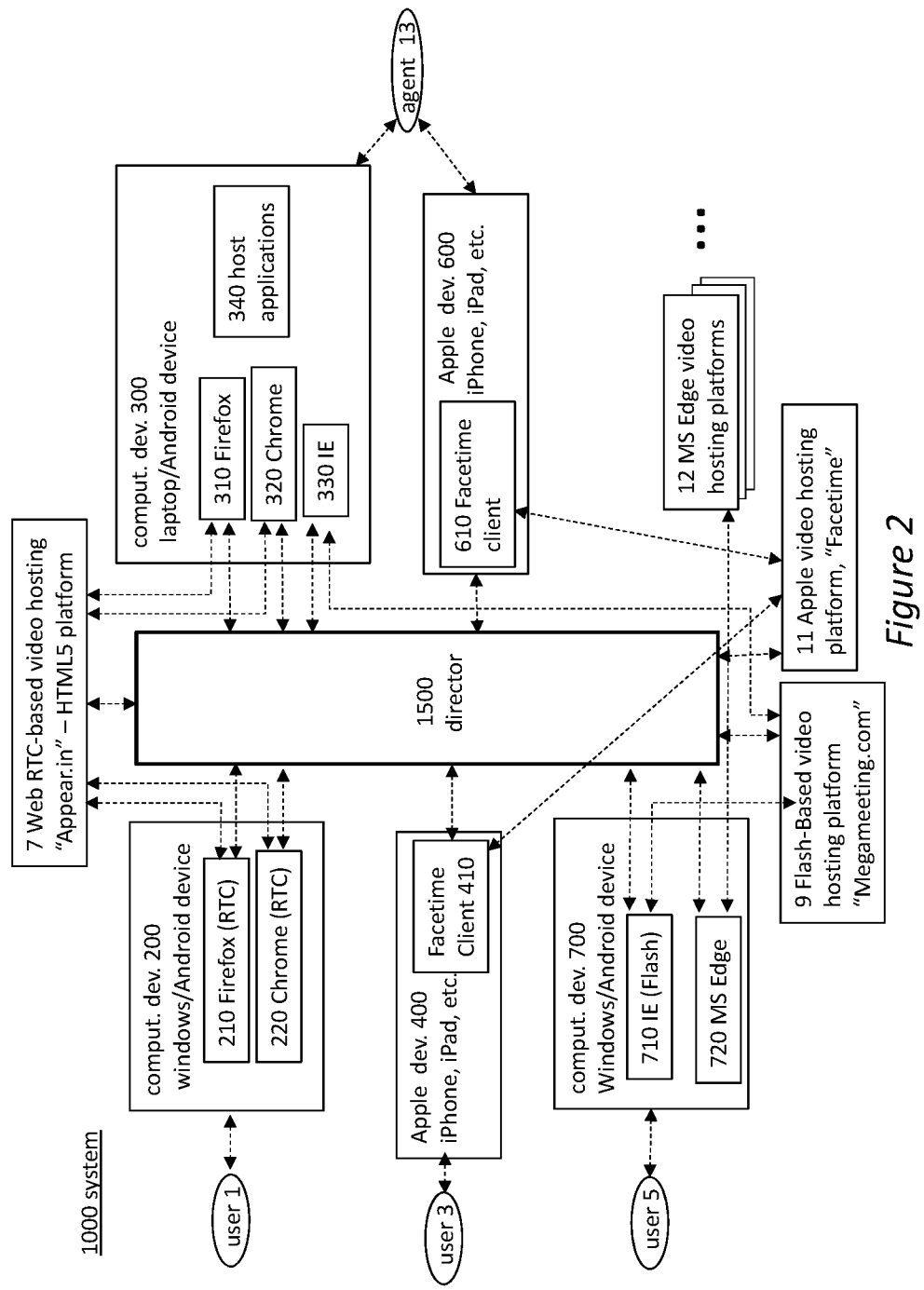
FIG. 2 is a block diagram of another embodiment of a system in accordance with the present invention.

FIG. 2 is a block diagram of another embodiment of a system in accordance with the present invention. In this embodiment, director 500 sends a link to computing device 200, allowing computing device 200 to directly connect to video conferencing platform 3, instead of connecting through director 500.

Also, computing devices 300, 400, 600, and 700 may receive links from director 1500 which allow them to directly connect to compatible video hosting platforms 7, 9, 11, 12.

Figure 4:
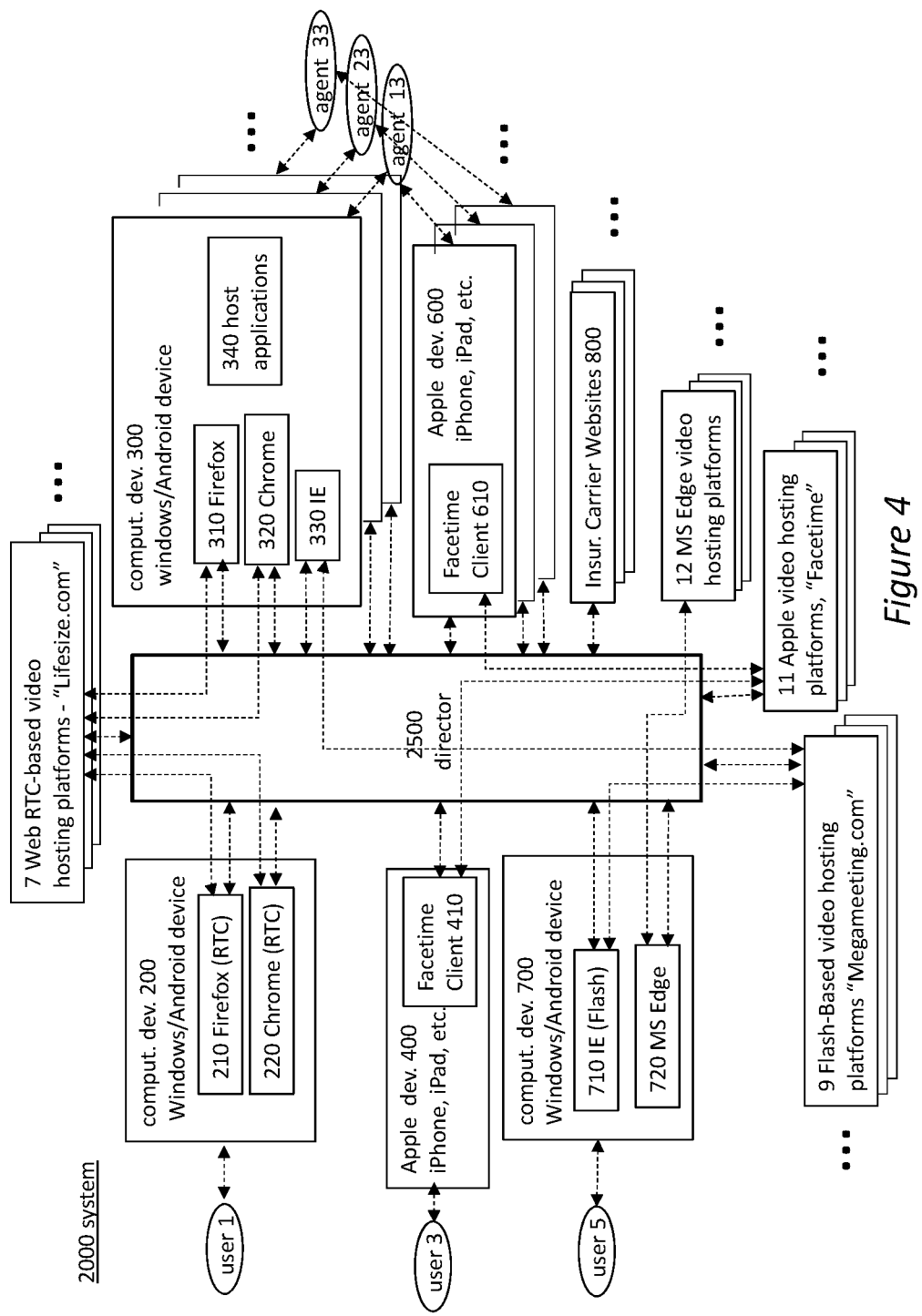
FIG. 4 is a block diagram of still another embodiment of a system in accordance with the present invention.

FIG. 4 is a block diagram of still another embodiment of a system in accordance with the present invention. In this embodiment, instead of a single agent 13, there are now a plurality of agents 13, 23, 33, etc.

Each of these agents has a corresponding computing device similar to that of computing device 300. Each is allowed to videoconference and share screens with one or more of the users.

Director 2500 is shown in FIG. 4 receiving and routing signals to and from video hosting platforms 7, 9, 11 and 12. It is understood that FIG. 4 can be modified to provide links to the user computing devices 200, 400, 700 to allow them to directly connect to the video hosting platforms 7, 9, 11, 12, as was described above.

In still another embodiment, instead of browsers or connection application, computing devices 200, 400, 700 may have an App which is 'hardwired' to connect to the director 500, 1500, 2500. The App may include all the features described above and additionally include links to insurance carrier websites 800. In this manner, the users 1, 3, 5 can video conference with agents 13, 23, 33, etc. They also can run host application 340 to show various information/graphics on the screens of the computing devices 200, 400, 700.

The App can also have an interface to link to and interact with websites of various insurance carriers, such as Travelers, Progressive, etc. This can all be done without the user having to know and type in the insurance company's URL, the insurance carrier's URL, the user's insurance policy number, etc. This will provide quick and accurate information to the user with minimal effort.

Figure 5:
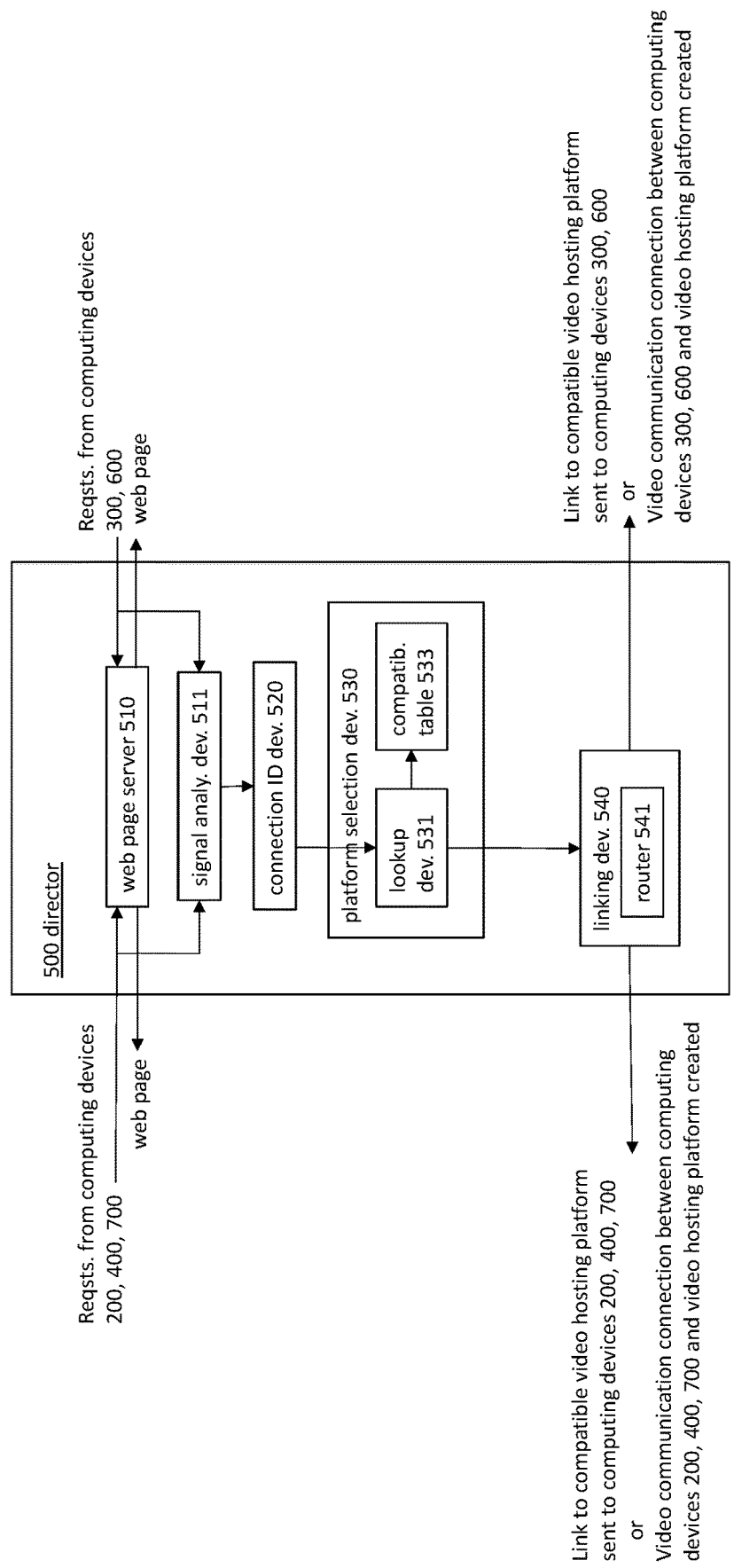
FIG. 5 is a more detailed illustration of an embodiment of a director compatible with the current invention.

FIG. 5 is a more detailed illustration of an embodiment of a director 500 compatible with the current invention. In this embodiment, requests for the agent's web pages are sent by the user's computing device 200, 400, 700 to the director 500.

Web page server 510 receives the request and 'serves' the web pages to the requesting computing device 200. User 1 selects a button requesting a videoconference with agent 13.

In at least one embodiment, a browser ID device 520 also receives the request from computing device 200. It analyzes the request and determines if it is an Apple device 400, or other device. If it is an Apple device, then this determination is sent through lookup device 531 to linking device 540 for connection to Apple video hosting platform 11 of FIGS. 1, 2 and 4. This connection may be through the director 500, 2500 as shown in FIGS. 1 and 4, or may be a direct link between the user's computing device 400 and the Apple video hosting platform 11, as shown in FIG. 2.

Lookup device 531, knowing the browser type, then looks up compatible formats and video hosting platforms 7, 9, 11, 12 in the compatibility table 533 which employ these compatible formats, and hyperlinks to these video hosting platforms 7, 9, 11, 12.

An example of a compatibility table is shown below.

| OS | Connectn. Applic. | Format | Compatibility Table Video Conf Serv. | Company User(s) | URL |
|---|---|---|---|---|---|
| Windows | Mozilla Firefox | web-RTC | Appear.in | single | http://appear.in |
| Windows | Google Chrome | web-RTC | Appear.in | single | http://appear.in |
| Windows | Mozilla Firefox | web-RTC | Lifesize.com | multiple | http://lifesize.com |
| Windows | Google Chrome | web-RTC | Lifesize.com | multiple | http://lifesize.com |

Compatibility Table

| OS | Connectn. Applic. | Format | Video Conf Serv. | Company User(s) | URL |
|---|---|---|---|---|---|
| Windows | Microsoft IE | Flash-type | MegaMeeting.com | single | http://megameeting.com |
| Windows | Microsoft Edge | web-RTC | Appear.in | single | http://appear.in |
| Windows | Microsoft Edge | web-RTC | Lifesize.com | multiple | http://lifesize.com |
| Apple iOS | Facetime Client | Apple browser/Facetime client | Facetime server | single | Apple web servers |

Linking device 540 then may send one of the links to the user's computing device 200 to make a direct link to the video hosting platform 7, 9, 11, 12.

Alternatively, there may be a return link in which the user's computing device 200 makes a connection back to the director after a videoconferencing session is completed.

Alternatively, linking device 540 may make its own connection to the video hosting platform 7, 9, 11, 12 and function to pass video communication between the video hosting platform 7, 9, 11, 12 and the user's computing device 200.

In alternative embodiments, functions of the director may be moved to, and performed by the computing device 300 and/or Apple device 600.

When user 3 requests a video conference, the director 500, 1500, 2500 directs both the Apple device 400 of user 1 and the Apple device 600 of agent 13 to connect using Facetime client to Apple video hosting platform 11.

Although a few examples have been shown and described, it will be appreciated by those skilled in the art that various changes and modifications might be made without departing from the scope of the invention, as defined in the appended claims.

What is claimed is:

1. A system for allowing videoconferencing between a user and an agent that does not require prior knowledge of the user, downloading of software or configuration on the part of the user, comprising:
   a. a user's computing device having an existing connection application that is currently loaded on the user's computing device adapted to connect to a web server, and connect to a video hosting platform and videoconference with other computing devices coupled to a common video hosting platform;
   b. an agent's computing device adapted to connect to a web server using a connection application, and connect to a video hosting platform and videoconference with the other computing devices coupled to the same video hosting platform;
   c. a director coupled to the user's computing device comprising:
      i. a web server adapted to provide web pages upon receiving a request;
      ii. a connection ID device which includes a signal analysis device adapted to identify a communication format of the existing connection application of the user's computing device;
      iii. a platform selection device adapted to determine at least one video hosting platform compatible with the existing connection application currently used by the user's computing device;
      iv. a linking device adapted to couple the director to the user's computing device, the director to the agent's computing device and the director to one of the compatible video hosting platforms;
      v. wherein, the director passes video communications between the user's computing device and the coupled video hosting platform and the director also passes video communications between the agent's computing device and the coupled video hosting platform to perform real-time video conferencing.

2. The system of claim 1, wherein:
   the existing communication software is a standard web browser: and
   the platform selection device has a lookup device which searches a compatibility table having entries representing a plurality of standard web browsers, their corresponding communication formats and video hosting platforms compatible with each standard web browser communication format to find a compatible video hosting platform.

3. The system of claim 2 wherein the linking device creates a link and sends the link to the user's computing device and the agent's computing device which will directly connect them to the compatible video hosting platform.

4. The system of claim 2 wherein the linking device comprises:
   a router adapted to:
      i. receive and pass communications between the compatible video hosting platform and the user's computing device; and
      ii. receive and pass communications to/from the compatible video hosting platform and the agent's computing device.

5. A method of providing video conferencing between a user and an agent that does not require prior knowledge of the user, downloading of software or configuration on the part of the user, comprises the steps of:
   a. completing an initial setup of a system to be used;
   b. using a user's computing device and an existing web connection application to connect to a standard website of an agent;
   c. indicating that the user would like to videoconference with the agent;
   d. coupling a director to the user's computing device;
   e. employing the director to determine at least one compatible video hosting platform by:
      i. automatically determining a format of an existing connection application that is currently on the user's computing device and is being used by the user's computing device,
      ii. automatically determining the current video format capabilities of the user's existing connection application,
      iii. looking up a compatible video hosting platform in a compatibility table,
   f. coupling an agent's computing device to at least one of the video hosting platform to which the user's computing device is coupled and the director;

g. employing the director to pass video communications between the user's computing device and the coupled video hosting platform; and h. employing the director to pass video communications between the agent's computing device and the coupled video hosting platform; and i. video conferencing the user's computing device with the agent's computing device in real-time without requiring the user to set up an account.

6. The method of claim 5, wherein the step of connecting the user's computing device comprises the steps of:

a. acquiring a link to the compatible video hosting platform;

b. sending the link to the user's computing device to allow it to directly connect to the video hosting platform; and c. sending the link to the agent's computing device to allow it to directly connect to the video hosting platform allowing real-time videoconferencing between user and agent.

7. The method of claim 5 wherein the step of determining the connection application being used by the user's computing device comprises the steps of:

a. sending a communication received from the existing connection application of the user's computing device to a connection ID device, and b. using a connection ID device to analyze the communication to determine a format and type of connection application that sent the communication.

8. The method of claim 5 wherein the step of determining a format and type of connection application being used by the user's computing device comprises the steps of:

a. sending a webpage to the user's computing device having a plurality of buttons, each associated with a different connection application, b. monitoring the button selected by the user thereby indicating the connection application and its format being used by the user's computing device.

9. The method of claim 5 wherein the step of completing initial setup of the system to be used comprises the steps of:

a. defining existing connection applications to be supported by the system, b. determining unmodified video format capabilities for each supported connection application, c. identifying video hosting platforms;

d. identifying compatible formats for each video hosting platform, e. identifying the hyperlinks to each video hosting platform, and f. creating a compatibility table indicating the video hosting platforms which are compatible with each supported existing connection application, and their corresponding hyperlinks.

10. A system for allowing videoconferencing between a user and an agent that does not require prior knowledge of the user, downloading of software, or configuration on the part of the user comprising:

a. a user's computing device having an existing connection application that was previously loaded on the user's computing device, adapted to connect to a web server, and connect to a video hosting platform and videoconference with other computing devices coupled to a common video hosting platform;

b. an agent's computing device having a connection application adapted to connect to a web server, and to a video hosting platform and videoconference with other computing devices coupled to a common video hosting platform;

c. a connection ID device adapted to identify a type of supplied connection application of the user's computing device;

d. a director coupled to the user's computing device comprising:

i. a web server adapted to provide web pages upon receiving a request;

ii. a platform selection device adapted to determine at least one video hosting platforms compatible with the existing connection application currently used by the user's computing device; and iii. a linking device adapted to couple the user's computing device and the agent's computing device to the same compatible video hosting platform;

e. wherein video communications are passed between the user's computing device and the coupled video hosting platform, and video communications are also passed between the agent's computing device and the coupled video hosting platform to perform real-time video conferencing.

11. The system of claim 10 wherein connection ID device requests and receives information about the existing connection application on the user's computing device to determine a connection application being used and its format.

12. The system of claim 10 wherein the connection ID device further comprises:

a signal analysis device which analyzes communications from the connection application of the user's computing device to determine the format of the connection application being used.

13. The system of claim 10 wherein:

a. the existing communication software is a standard web browser; and b. the platform selection device has a lookup device which searches a compatibility table having entries representing a plurality of standard web browsers, their corresponding communication formats and video hosting platforms compatible with each standard web browser communication format to find a compatible video hosting platform.

14. The system of claim 10 wherein the linking device creates a link and sends the link to the user's computing device and the agent's computing device which will directly connect them to the compatible video hosting platform.

15. The system of claim 10 wherein the linking device comprises:

a router adapted to:

i. receive and pass communications between the compatible video hosting platform and the user's computing device; and ii. receive and pass communications to/from the compatible video hosting platform and the agent's computing device.

16. The system of claim 10 wherein the connection application is a web browser.

17. The system of claim 10 wherein the connection application is an iOS-based communication application.

* * * * *